June 29, 1954 P. H. CHIN ET AL 2,682,580

TELEPHONE RECEIVER AND TRANSMITTER SUPPORTING ATTACHMENT

Filed March 10, 1950

INVENTORS
PAO H. CHIN
HSUE C. TSIEN

BY [signature]

ATTORNEY

Patented June 29, 1954 2,682,580

UNITED STATES PATENT OFFICE 2,682,580

TELEPHONE RECEIVER AND TRANSMITTER SUPPORTING ATTACHMENT

Pao H. Chin, Forest Hills, and Hsue C. Tsien, Whitestone, N. Y.

Application March 10, 1950, Serial No. 148,974

2 Claims. (Cl. 179—149)

This invention relates to attachments for use in connection with telephones employing the unitary receiver and transmitter member usually termed a "handset" which is detachable with respect to a circuit controlling base. More particularly, our invention deals with an attachment comprising a supporting plate, on which the telephone base is adapted to be arranged and a universally supported arm, with which the handset is coupled, so that said handset can be conveniently supported in position for use by an individual, leaving both hands free for the taking of notes and the like, while the telephone is being used.

Still more particularly, the invention includes a supplemental or dummy member arranged on said arm for controlling the circuit of the telephone base, while leaving the handset at all times in position for convenient use.

The novel features of the invention will be best understood from the following description, when taken together with the accompanying drawing, in which certain embodiments of the invention are disclosed and, in which, the separate parts are designated by suitable reference characters in each of the views and, in which.

Figures 1, 2, 3:
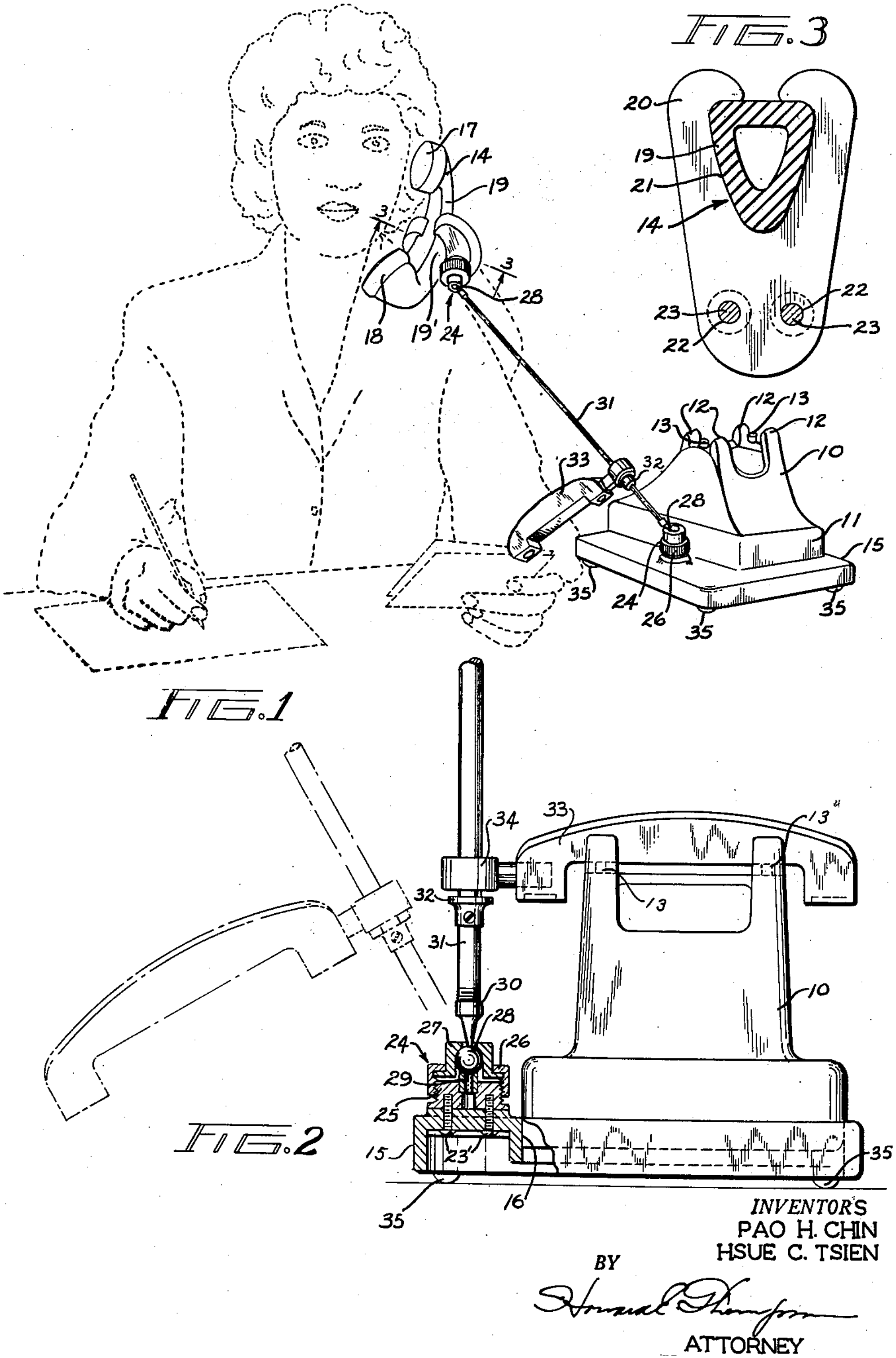
Fig. 1 is a diagrammatic view showing one of our improved attachments in position for use and indicating in dotted lines the freedom of the hands of the user of the telephone.
Fig. 2 is a face view of the base plate of the attachment showing the same in full lines in inoperative position and in dot and dash lines in operative position, and with part of the construction in section.
Fig. 3 is an enlarged section on the line 3—3 of Fig. 1.

In Fig. 1 of the drawing, we have diagrammatically shown at 10 the circuit control base of a standard telephone having a rectangular lower portion 11 and upwardly extending side yokes 12 at the contracted top of the base. Between the yokes 12 are arranged switch pins or buttons 13 adapted to be held in open circuit position, when the handset 14 is arranged on the base in the usual manner.

It will be understood that some of the bases 10 are of different construction and, from this standpoint, the shape and construction of our supporting plate 15 will be modified so that the socket portion 16 thereof will be shaped to receive the lower portion, such as the rectangular portion 11.

Between the receiver 17 and transmitter 18 of the member 14 is a curved body portion 19, generally of the cross-sectional contour illustrated in Fig. 3 of the drawing. The ends of the body 19, adjacent the receivers and transmitters 17 and 18, are usually narrower than the central portion, so as to facilitate slipping-on of a yoke 20 at either end to move the yoke into snug gripping engagement with the larger central portion 19' in the manner illustrated diagrammatically in Fig. 1.

The yoke 20 is preferably composed of rubber or plastic material, so as to establish a firm gripping engagement without marring or defacing the member 14.

Considering Fig. 3 of the drawing, it will appear that the opening 21 of the yoke is made to fit snugly upon the contour of the central portion 19' of the body 19.

The cross-head of the yoke 20 has a pair of apertures 22 for reception of screws, as at 23, similar to the screws 23' shown in Fig. 2 for attachment of a universal joint unit 24 therewith. As both units 24 are of the same construction, the brief description of one will apply to both. One of these units is secured to the base plate 15, as clearly illustrated in Fig. 2 of the drawing and this unit will be specifically described.

The screws 23' fix to the plate 15 an externally threaded socket 25, with which is coupled a tightening collar 26 for applying pressure to a cup 27, in which a spherical or ball member 28 is seated. Seated in the socket 25 is a bearing member 29, against which the ball end 28 seats to control frictional engagement of the ball 28 in the device. The ball member 28 has an outwardly projecting internally threaded sleeve 30, with which a rod 31 is coupled.

Considering Fig. 1 of the drawing, the corresponding ball member 28 of the upper or outer unit 24 is coupled with the other or upper end of the rod 31. Fixed to the rod adjacent the lower end thereof is a stop collar 32 adapted to check downward movement of a supplemental or dummy circuit control member 33. This member may be in the form of a plastic casting and will include an outwardly projecting sleeve portion 34 freely mounted on the rod 31 to slide longitudinally thereon, as well as to rotate thereon.

The member 33 is utilized to operate the arm 31 and to control the circuit through the pins 13 in the manner illustrated in Fig. 2. In other words, when the telephone is not in use, the member 33 will be mounted on the base 10 in a manner similar to the normal mounting of the handset 14 thereon and, in this position, the rod 31 will assume a perpendicularly erect position, or substantially so, as indicated in full lines in Fig. 2.

Upon receiving a call or when it is desired to use the telephone, the operator will simply grasp the member 33 by one hand and, through the medium of the member 33, swing the arm 31 into a position, bringing the handset 14 in a convenient position for use, in the manner indicated in Fig. 1 of the drawing.

In returning the parts to the inoperative position, the operator will grasp the member 33, swing the arm 31 upwardly and again place the member 33 on the base 10.

It will be understood that, in the use of the device herein described, the member 19 will be arranged in a pre-adjusted position, suiting the fancies of the user. Thus no lost motion will take place, bearing in mind that, under normal practice, it is always required to remove the transmitter from the base.

The base plate 15 of the attachment will preferably be made of heavy material and will have, at the corner portions thereof, cushioned supporting feet or pads 35 to protect a surface, on which the attachment is arranged and the weight of the base plate, plus the weight of the telephone base or stand 10 will be sufficient to support the member 19 in the angular position indicated.

Having fully described our invention, what we claim as new and desire to secure by Letters Patent is:

1. A handset supporting attachment for telephones, comprising a base plate having a socket portion for reception of a telephone base, an elongated rod, said rod having spherical ends, a socket and collar engaging each of the spherical ends in forming universal joint couplings at the ends of the rod, means for attaching one coupling directly to said base plate, a handset supporting yoke including a crosshead, the crosshead of said yoke having spaced apertures, fasteners arranged in said apertures in securing the socket of the other coupling to said yoke, said yoke being composed of yieldable material to frictionally engage a handset between and in spaced relation to end portions thereof, and said rod being adapted to support the handset in spaced relation from the telephone base in the use of the handset.

2. A handset supporting attachment for telephones, comprising a base plate having a socket portion for reception of a telephone base, an elongated rod, said rod having spherical ends, means engaging said spherical ends forming universal joint couplings at the ends of the rod, means for attaching one coupling directly to said base plate, a handset supporting yoke secured directly to the other coupling, said yoke being adapted to frictionally engage a standard handset between end portions thereof, said rod being adapted to support the transmitter in spaced relation from the telephone base in the use of the telephone, means freely slidable on said rod and adapted to be arranged upon the telephone base to normally open the telephone circuit when the device is not in use, said last named means forming a handgrip for manipulation of said rod to move the transmitter into position for use, said last named means being rotatably mounted on the rod, and means on the rod for limiting sliding movement of the handgrip in one direction thereon intermediate said couplings.

References Cited in the file of this patent

UNITED STATES PATENTS

| Number | Name | Date |
|---|---|---|
| 357,337 | Rosenblatt | Feb. 8, 1887 |
| 1,358,506 | Bensberg | Nov. 9, 1920 |
| 2,260,703 | Daly | Oct. 28, 1941 |
| 2,310,032 | Mathieson | Feb. 2, 1943 |
| 2,621,262 | Hoagland | Dec. 9, 1952 |

FOREIGN PATENTS

| Number | Country | Date |
|---|---|---|
| 179,266 | Switzerland | Nov. 1, 1935 |

OTHER REFERENCES

New York Times, page 78, section 1, Mar. 5, 1950.